United States Patent
Bondioli

(10) Patent No.: US 7,011,583 B2
(45) Date of Patent: Mar. 14, 2006

(54) WIDE-ANGLE CONSTANT-VELOCITY JOINT, WITH ARRANGEMENT FOR REDUCING THE STRESSES OF THE INTERNAL MEMBERS

(76) Inventor: Edi Bondioli, Via Gina Bianchi, 18-46029, Suzzara, Mantova (IT)

( * ) Notice: Subject to any disclaimer, the term of this patent is extended or adjusted under 35 U.S.C. 154(b) by 0 days.

(21) Appl. No.: 10/748,382

(22) Filed: Dec. 30, 2003

(65) Prior Publication Data

US 2004/0152524 A1 Aug. 5, 2004

(30) Foreign Application Priority Data

Jan. 3, 2003 (IT) ............................. FI2003A0002

(51) Int. Cl.
*F16D 3/33* (2006.01)
(52) U.S. Cl. ...................... 464/118; 464/905
(58) Field of Classification Search ............... 464/117, 464/118, 905; 403/205; 49/424; 74/110
See application file for complete search history.

(56) References Cited

U.S. PATENT DOCUMENTS

| 4,997,407 A | 3/1991 | Kretschmer et al. |
| 5,419,740 A | 5/1995 | Koyari et al. |
| 2002/0187840 A1 | 12/2002 | Herchenbach et al. |

FOREIGN PATENT DOCUMENTS

| EP | 1 176 327 | 1/2002 |
| FR | 818717 | 10/1937 |
| JP | 6-185535 | 7/1994 |

*Primary Examiner*—Greg Binda
(74) *Attorney, Agent, or Firm*—McGlew & Tuttle, PC

(57) ABSTRACT

The joint comprises two spiders (10, 14) and a central core forming a cavity for sliding movement in a transverse plane for two constraint members (120) with seats (120A) for the spherical heads (10B; 14B) on the ends of the two forks (10, 14); a divider (150) divides said cavity into two housings (124) for the two constraint members (120).

20 Claims, 7 Drawing Sheets

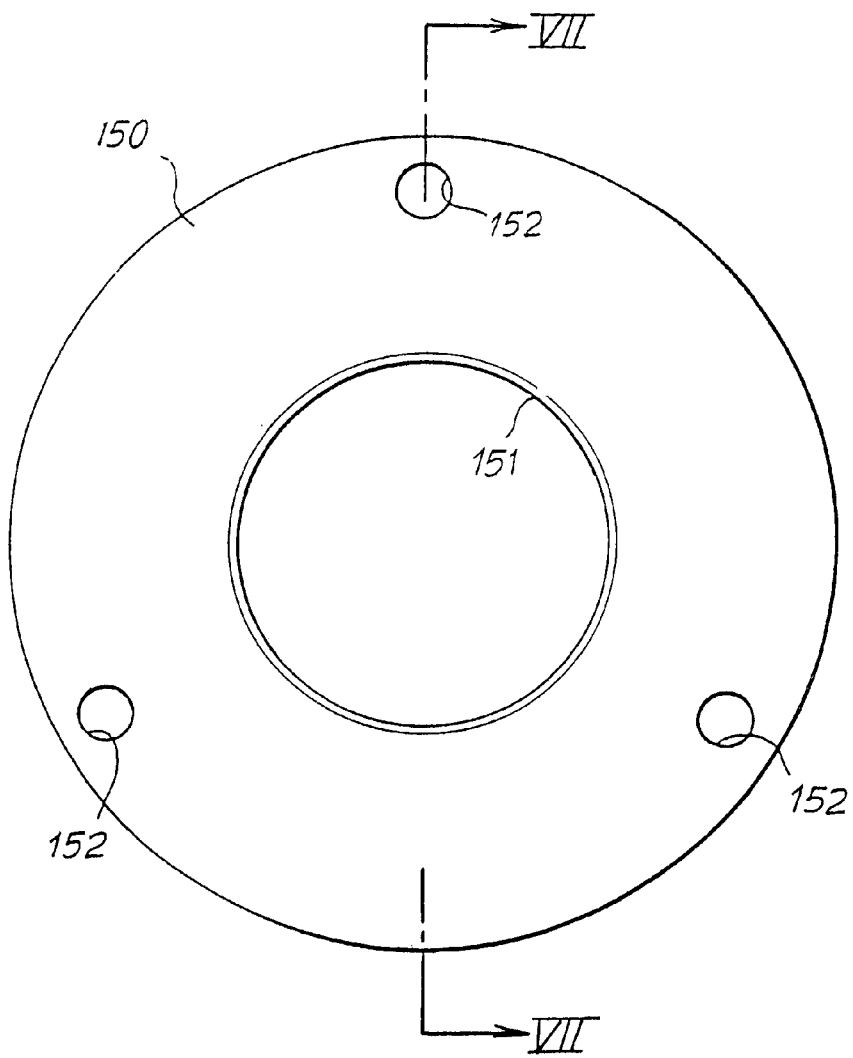
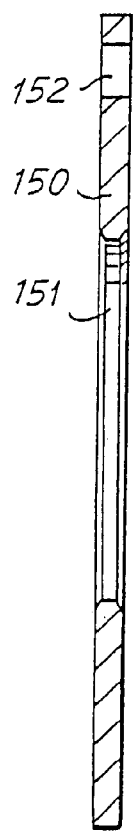
Fig 6
Fig. 7

WIDE-ANGLE CONSTANT-VELOCITY JOINT, WITH ARRANGEMENT FOR REDUCING THE STRESSES OF THE INTERNAL MEMBERS

FIELD OF THE INVENTION

The invention relates to a wide-angle constant-velocity joint for drive shafts and the like, improved to give a reduction in the stresses to which the internal members of conventional joints are usually subjected. These and other objects and advantages will become clear in the course of the following text.

DESCRIPTION OF RELATED ART

The present wide-angle constant-velocity joint is of the type comprising two forks forming the input and output members of the joint, two spiders, and a central core forming a cavity for sliding movement in a transverse plane for means forming constraint seats for the spherical heads on the ends of the two forks.

SUMMARY OF THE INVENTION

According to the invention, the joint comprises a divider which divides said cavity into two housings for two substantially symmetrical constraint members forming the respective seats for the spherical heads of said forks; each of the two constraint members slides simultaneously with the other member between said divider and the wall of the corresponding one of the two parts of said central core or a laminar ring that bears against said wall.

The two constraint members are joined together by two central protrusions that slide one inside the other and the divider has a large central window inside which said protrusions are able to move about.

Communication holes for lubrication of said seat are formed between each housing and the seat of the constraint member housed in said housing.

The two housings communicate through holes, to allow the supply of lubricating grease from a single grease nipple.

BRIEF DESCRIPTION OF DRAWINGS

A clearer understanding of the invention will be provided by the description and the attached drawing, the latter showing a practical, non-restrictive example of the invention. In the drawing:

FIGS. 6 and 7 show in isolation one of two components constructed in accordance with the invention, in end view and in section on VII—VII as marked in FIG. 6.

DETAILED DESCRIPTION OF THE PREFERRED EMBODIMENT

Figure 1:
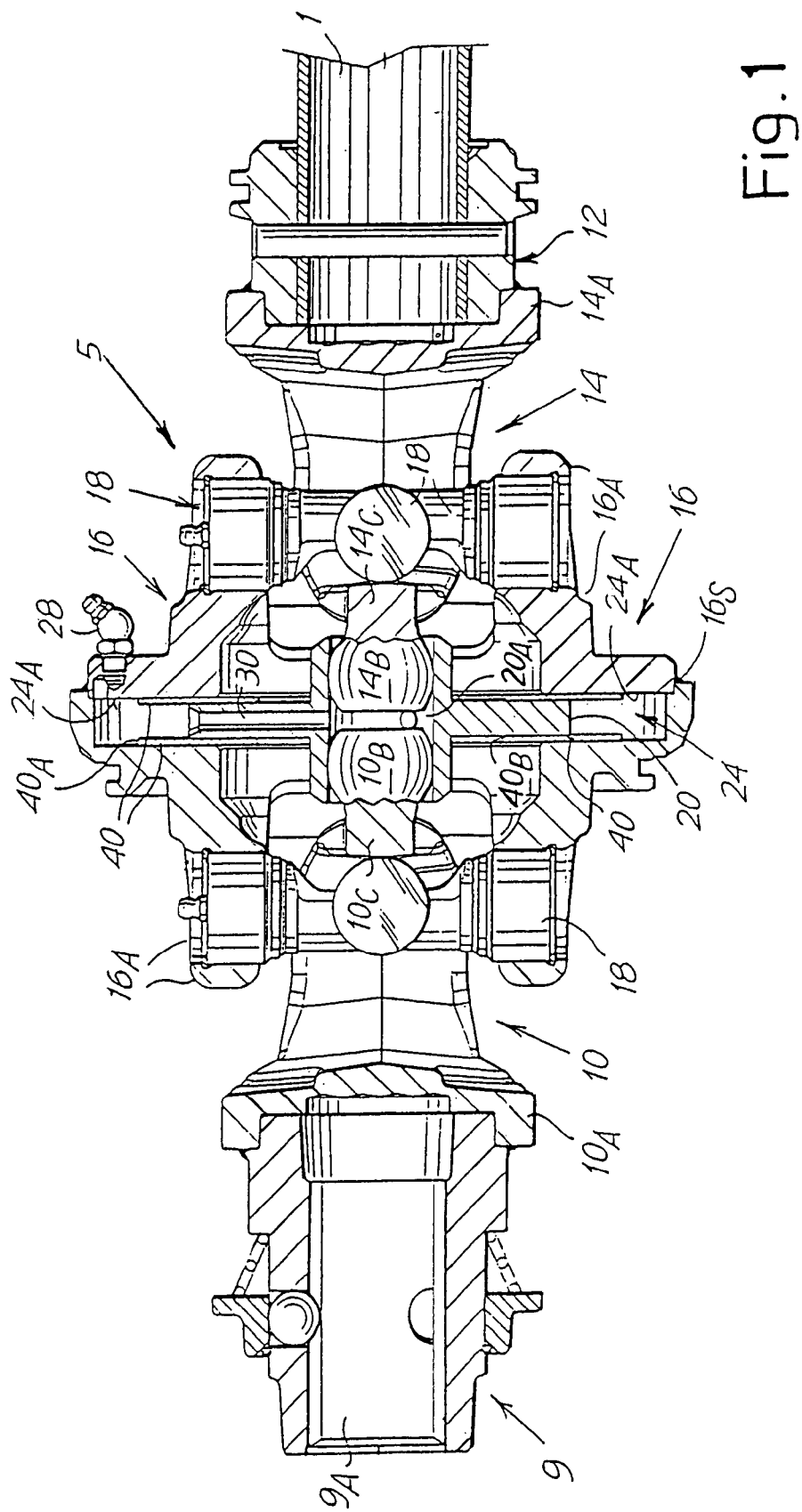
FIGS. 1 and 2 show a constant-velocity joint of an essentially conventional kind, in longitudinal, section and in two positions which it is capable of assuming.

The accompanying drawing (FIGS. 1 and 2) illustrates a wide-angle constant-velocity joint of an essentially conventional kind. Reference 1 denotes a tubular component of a telescopic shaft ending in a wide-angle constant-velocity joint 5. The telescopic shaft 1 may be fitted with a protective sheath. The constant-velocity joint 5, of the wide-angle kind, comprises a power coupling member 9, for input to or output from the joint, forming a grooved seat 9A for connection to a drive member with which the constant-velocity joint is combined. Integral with the member 9 is the base 10A of a fork 10 forming part of said joint 5. The telescopic shaft 1 is linked to a member 12 integral with the base 14A of a fork 14 forming part of said constant-velocity joint. Each of the two forks 10 and 14 comprises a terminal crosspiece 10C, 14C, from which a spherical head 10B, 14B extends, the said two spherical heads being opposite each other. The constant-velocity joint also includes a central core 16 that is made in two parts which are basically symmetrical about a plane at right angles to the overall axis of the joint considered with the input and output components of the members 9 and 12 in line with each other. The said two parts of the member 16 are connected together by welding at 16S, or by other means, such as bolts. The central core 16 has two opposing pairs of projections 16A, the projections of each pair forming seats of rotation for a corresponding spider, and each spider 18 is further hinged to the corresponding fork 10, 14, respectively, described above.

The arrangement described above gives a typical constant-velocity joint, which is further completed by a constraint member 20 which is of a discoidal shape with a central circular cylindrical through seat 20A in which the opposing spherical heads 10B, 14B of the two forks 10 and 14 are housed. The discoidal constraint member 20 is housed movably inside a discoidal housing 24, which is formed by two opposing parallel walls 24A, 24B formed by the two components of the central core 16. These two components are machined appropriately and then welded at 16S or otherwise connected together to retain the discoidal constraint member 20, 20B while allowing it to move. The central core 16 is provided with a grease nipple 28, which reaches the discoidal housing 24 via the discoidal constraint member 20. This member 20 has at least one radial hole 30 to allow communication between the housing 24 and the through seat 20A. This allows lubrication of the sliding surfaces 24A, 24B and the discoidal constraint member 20, and between the through seat 20A and the spherical heads 10B, 14B. Laminar rings 40 are usually interposed between the surfaces 24A and 24B and the two faces of the discoidal constraint member 20 to limit the losses of lubricating grease, which must first lubricate between the heads 10B or 14B and their seats.

Figure 2:
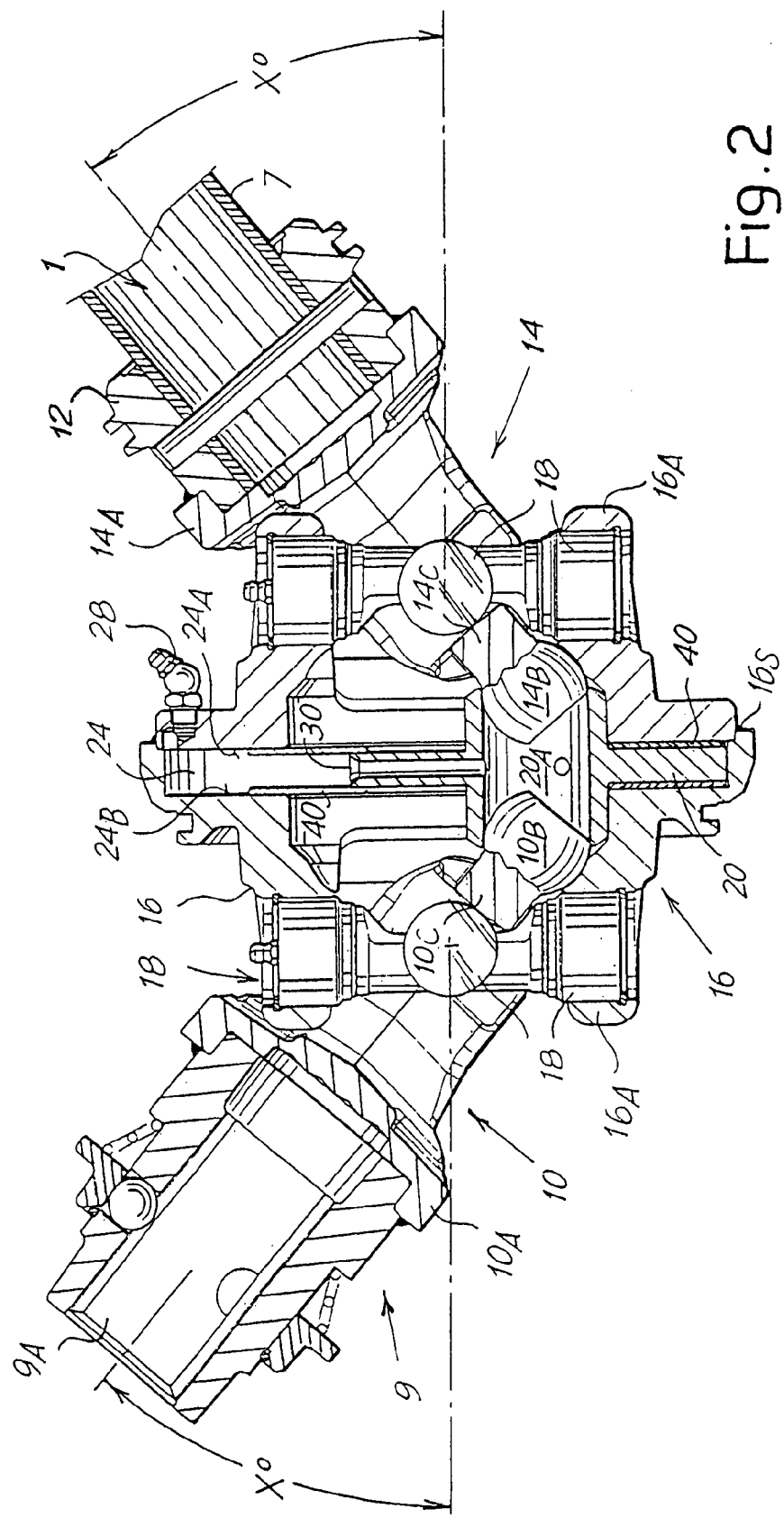

So far an example of a shaft with a constant-velocity joint of known type has been described, of the type designed to transmit drive even at large angles, such as the angle X° shown in FIG. 2, the purpose of which is well known.

In conventional solutions, such as that defined above and illustrated in FIGS. 1 and 2, fierce stresses are set out due to the simultaneous action of both spherical heads 10C, 14C rubbing against the discoidal constraint member 20 and against the seat 20A. This creates wrenching and wear, necessitating continual and efficient lubrication between parts in relative motion, and limits the total life of the joint.

Figure 3:
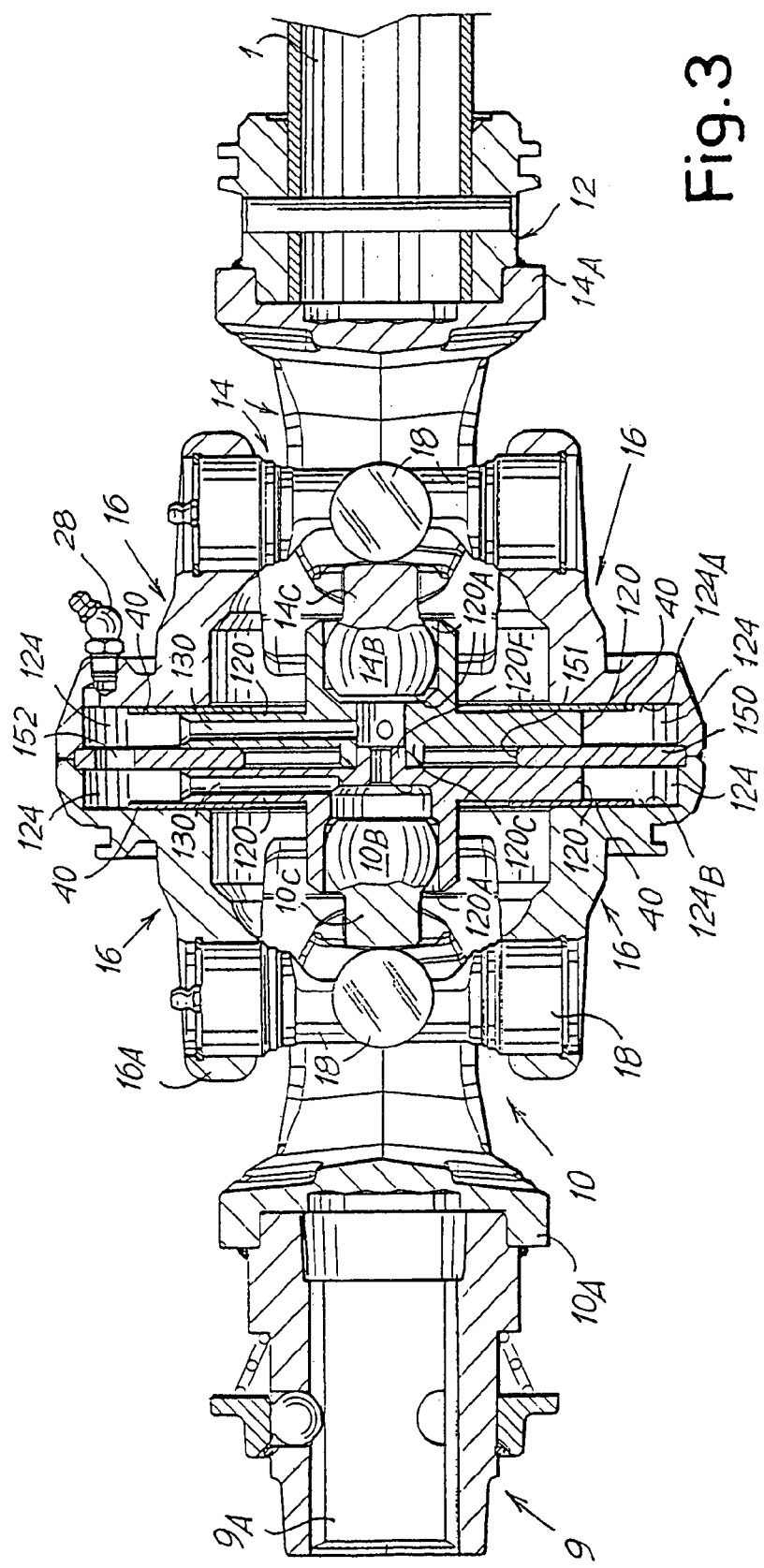
FIGS. 3 and 4 show an improved constant-velocity joint according to the invention in longitudinal section and in two positions.
Figure 4:
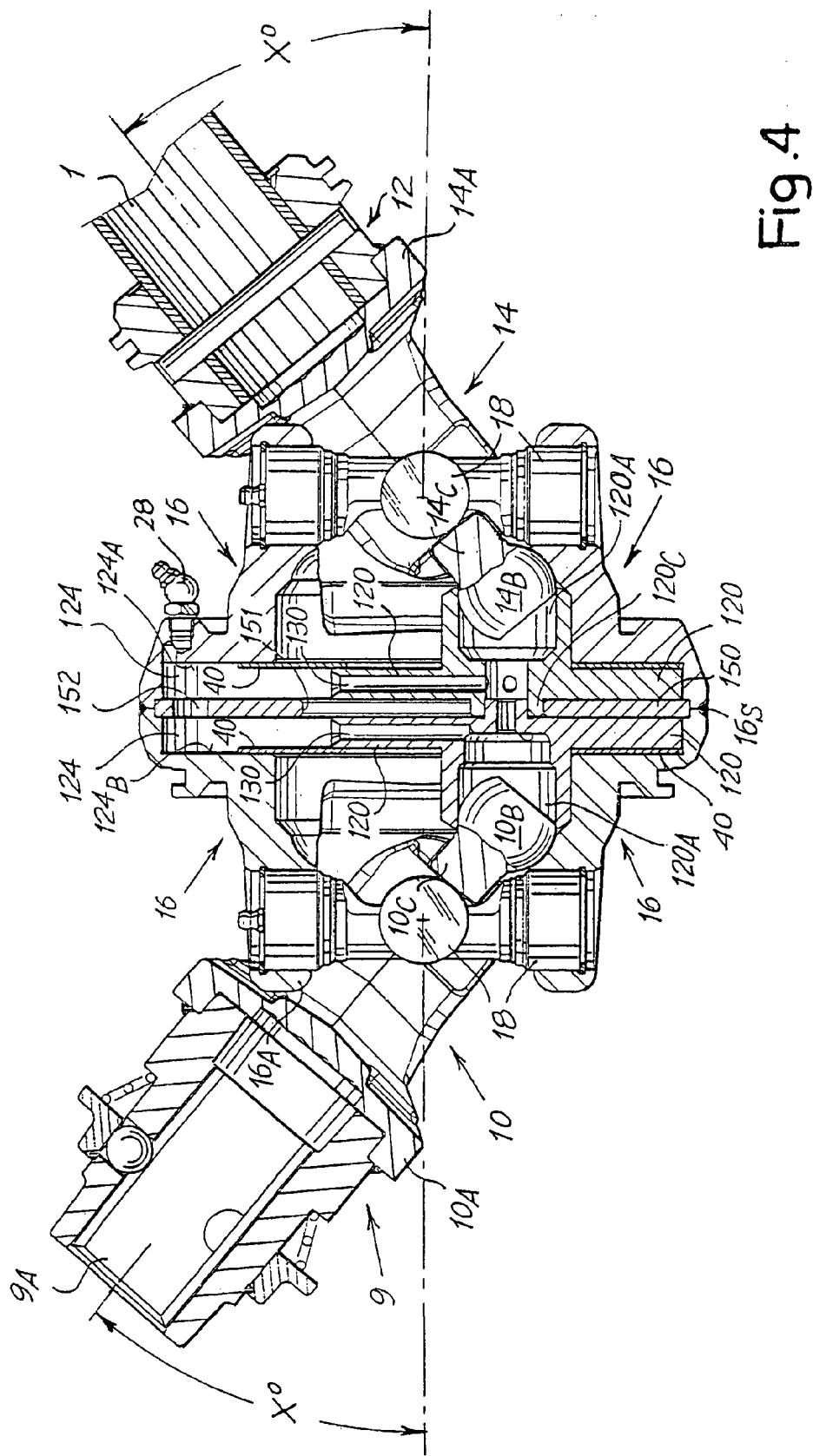
Figure 5:
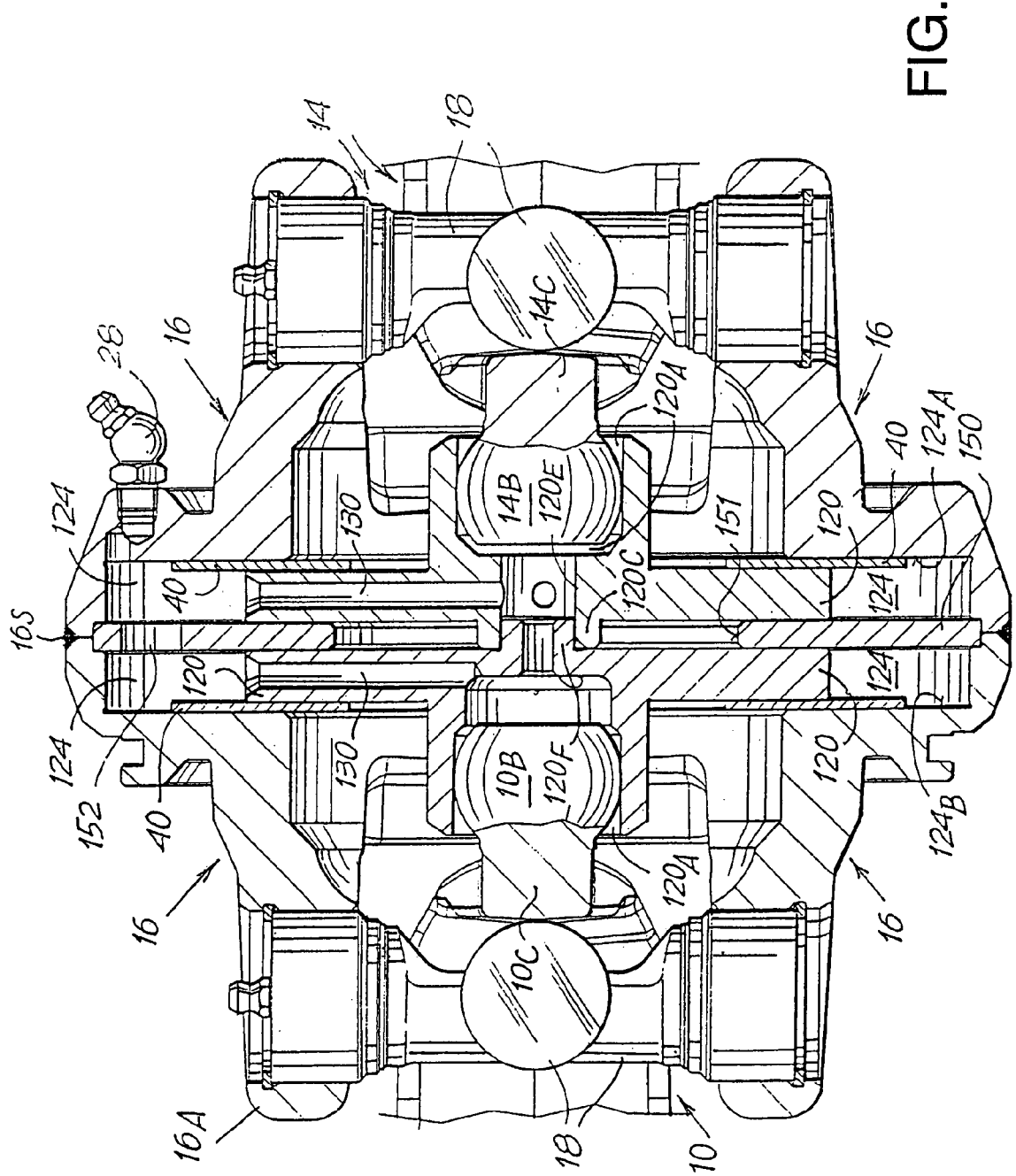
FIG. 5 shows a partial enlargement of FIG. 3.
Figure 8:
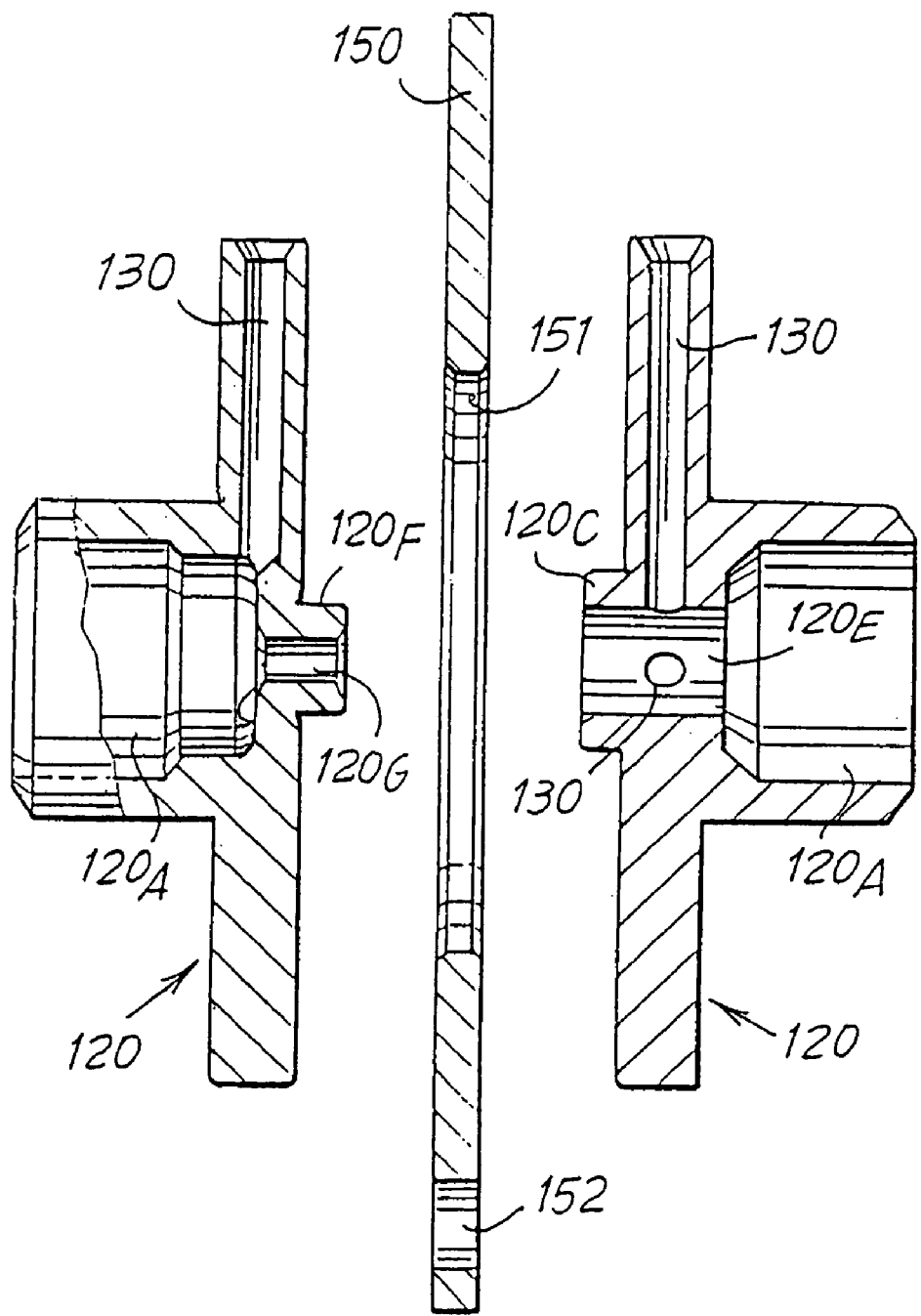
FIG. 8 is an exploded view in axial section of three internal components of a central core.

This invention solves these problems. As illustrated in FIG. 3 and ff, where the same references in FIGS. 1 and 2 are used for the corresponding parts, the single constraint member 20 is replaced with two substantially symmetrical separate constraint members 120, each having a seat 120A in which the corresponding spherical head 10B or 14B of the two forks 10 and 12, respectively, is slidingly accommodated. The central core 16 still consists of two substantially symmetrical parts, shaped to form a discoidal housing similar to the housing 24 of the embodiment shown in FIGS. 1 and 2. When the two parts of the central core 16 are connected together (for example by the weld 16S), a discoidal divider 150 (see also FIGS. 6, 7 and 8) with a large central circular window 151 is held peripherally between them. This divider 150 separates the abovementioned discoidal housing (similar to the housing 24) into two separate housings 124 communicating with each other through said window 151 and through a number of through holes 152. The grease nipple 28 therefore supplies both housings 124. Each of said two housings accommodates one of the two constraint members 120, which can slide in a guided manner between the corresponding surface of the divider 150 and the corresponding wall 124A or 124B or the corresponding laminar ring 40, if present. Each of said constraint members 120 has a number of radial holes 130 (for example three) which allow communication between the housing 124 and the corresponding seat 120A, to allow lubrication between the seat 120A and the corresponding head 10B or 14B. One of the two constraint members 120 (that on the right-hand side viewing the drawing) has a cylindrical protrusion 120C with a large through hole 120E into which the holes 130 lead. The other constraint member 120 has in turn a smaller cylindrical protrusion 120F designed to fit into the through hole 120E. When the components 120, 120 and 150 are brought together and the two parts of the core 16 welded at 16S, the protrusions 120C and 120F engage one inside the other in a sliding manner and can move about inside the window 152 of the divider 150 during the identical and simultaneous movements of the two constraint members 120 inside the housings 124. A through hole 120G in the protrusion 120F allows communication between the two seats 120A of the two constraint members 120.

As a result of the above arrangement, with the separation provided by the divider 150 and with the doubling up of the conventional constraint member 20 into two constraint members 120 constrained by each other in only a limited degree by the protrusions 120C and 120F, there is a reduction in the stresses which are otherwise very high between the members of the joints, especially those in relative sliding movement and in particular between the heads 10B, 14B and the corresponding seats 120A, which now belong to two separate components. The resulting joint has a much longer life than conventional constant-velocity joints.

It will be understood that the drawing shows only an example given purely as a practical demonstration of the invention, which latter may be varied in its shapes and arrangements without thereby departing from the scope of the concept on which the invention is based. The presence of any reference numbers in the appended claims is purely for the purpose of facilitating the reading of the claims with reference to the description and drawing, and does not limit the scope of protection represented by the claims.

What I claim is:

1. A wide-angle constant-velocity joint comprising:
    two forks forming the input and output members of the joint, each of said two forks having a spherical head at each respective distal end;
    two spiders; and
    a central core formed of two parts defining a cavity between two opposed walls, each formed by a corresponding one of said two parts, for sliding movement in a transverse plane of two substantially symmetrical constraint members forming respective seats for said spherical heads on the ends of said forks, said two constraint members being connected together, wherein a discoidal divider divides said cavity into two housings, each of said constraint members sliding between said discoidal divider and a corresponding one of said opposed walls of said cavity or a laminar ring that bears against each of said walls.

2. A constant-velocity joint according to claim 1, wherein said two constraint members are joined together by two central protrusions that slide one inside the other, and said discoidal divider has a central window inside which said two central protrusions are able to move about.

3. A constant-velocity joint according to claim 2, wherein said discoidal divider is rigidly connected to said central core.

4. A constant-velocity joint according to claim 2, wherein said discoidal divider is held peripherally between said two parts forming said central core, when said two parts are connected together.

5. A constant-velocity joint according to claim 2, wherein communication holes for lubrication of said seats are formed between each said housing and said seat of said constraint member housed in said housing.

6. A constant-velocity joint according to claim 2, wherein said central protrusion of each constraint member is arranged centrally with respect to a corresponding discoidal shaped portion.

7. A constant-velocity joint according to claim 1, wherein said discoidal divider is rigidly connected to said central core.

8. A constant-velocity joint according to claim 7, wherein said discoidal divider is held peripherally between said two parts forming said central core, when said two parts are connected together.

9. A constant-velocity joint according to claim 7, wherein communication holes for lubrication of said seats are formed between each said housing and said seat of said constraint member housed in said housing.

10. A constant-velocity joint according to claim 1, wherein said discoidal divider is held peripherally between said two parts forming said central core, when said two parts are connected together.

11. A constant-velocity joint according to claim 1, wherein communication holes for lubrication of said seats are formed between each said housing and said seat of said constraint member housed in said housing.

12. A constant-velocity joint according to claim 1, wherein said two housings communicate through holes in said discoidal divider, to allow a supply of lubricating grease from a single grease nipple.

13. A constant-velocity joint according to claim 1, wherein each of said constraint members has a discoidal shaped portion sliding in a guided manner between the corresponding surface of said discoidal divider and the respective one of said walls or corresponding said laminar ring.

14. A constant-velocity joint according to claim 13, wherein said central protrusion of each constraint member is arranged centrally with respect to a corresponding discoidal shaped portion.

15. A wide-angle constant-velocity joint comprising:
    two forks forming the input and output members of the joint, each of said two forks having a spherical head at each respective distal end;
    two spiders, each of said two spiders supporting each of said two forks at a distance away from said respective distal end;

a central core formed by two parts with two opposed walls defining a cavity;

two substantially symmetrical constraint members being connected together and forming respective seats for receiving respective said spherical head, said symmetrical constraint members sliding in a transverse plane parallel to said opposed walls; and a discoidal divider dividing said cavity into two housings, each of said constraint members sliding each of said two housings between said discoidal divider and a corresponding one of said opposed walls or a laminar ring that bears against said opposed walls.

16. A constant-velocity joint according to claim 15, wherein said two constraint members are joined together by two central protrusions that slide one inside the other, and said discoidal divider has a central window inside which said two central protrusions are able to move about.

17. A constant-velocity joint according to claim 16, wherein said central protrusion of each constraint member is arranged centrally with respect to a corresponding discoidal shaped portion.

18. A constant-velocity joint according to claim 15, wherein said discoidal divider is rigidly connected to said central core.

19. A constant-velocity joint according to claim 15, wherein said discoidal divider is held peripherally between said two parts forming said central core, when said two parts are connected together.

20. A constant-velocity joint according to claim 15, wherein communication holes for lubrication of said seats are formed between each said housing and said seat of said constraint member housed in said housing.

* * * * *